United States Patent
Sampson et al.

(10) Patent No.: US 11,726,833 B2
(45) Date of Patent: *Aug. 15, 2023

(54) DYNAMICALLY PROVISIONING VIRTUAL MACHINES FROM REMOTE, MULTI-TIER POOL

(71) Applicant: Citrix Systems, Inc., Fort Lauderdale, FL (US)

(72) Inventors: Raymond Matthew Sampson, Burlington, MA (US); Kevin Joseph Webster, Burlington, MA (US); Marcos Alejandro Di Pietro, Burlington, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/137,845

(22) Filed: Dec. 30, 2020

(65) Prior Publication Data

US 2021/0117245 A1   Apr. 22, 2021

Related U.S. Application Data

(63) Continuation of application No. 15/923,548, filed on Mar. 16, 2018, now Pat. No. 10,896,069.

(51) Int. Cl.
| G06F 9/50 | (2006.01) |
| G06F 9/455 | (2018.01) |
| G06F 8/65 | (2018.01) |
| G06F 8/61 | (2018.01) |
| H04L 67/10 | (2022.01) |

(52) U.S. Cl.
CPC .............. *G06F 9/5077* (2013.01); *G06F 8/61* (2013.01); *G06F 8/65* (2013.01); *G06F 9/45533* (2013.01); *G06F 2209/5011* (2013.01); *H04L 67/10* (2013.01)

(58) Field of Classification Search
CPC ............... G06F 9/5077; G06F 9/45533; G06F 2209/5011

See application file for complete search history.

(56) References Cited

U.S. PATENT DOCUMENTS

| 7,962,563 | B2 | 6/2011 | Becker-Szendy et al. |
| 8,141,075 | B1 | 3/2012 | Chawla et al. |
| 8,307,174 | B1 | 11/2012 | Misra et al. |
| 8,321,862 | B2 | 11/2012 | Swamy et al. |
| 8,448,170 | B2 | 5/2013 | Wipfel et al. |
| 9,037,692 | B2 | 5/2015 | Ferris |
| 9,063,795 | B2 | 6/2015 | Bird et al. |
| 9,391,922 | B2 | 7/2016 | Herington et al. |
| 9,529,620 | B1 * | 12/2016 | Dow .................... G06F 9/45558 |

(Continued)

*Primary Examiner* — Lewis A Bullock, Jr.
*Assistant Examiner* — Kevin X Lu (57) ABSTRACT

A technique for dynamically provisioning virtual machines for running a cloud-based software application includes querying a pool manager of a multi-tiered pool of virtual machines to identify a set of classes of virtual machines, which meet a specified size criterion, and a respective TVC (time-variant characteristic) for each class. If an identified one of the set of classes has a smaller TVC than a TVC of one of the virtual machines currently running the application, the technique proceeds to swap the current virtual machine for a virtual machine having the identified class.

15 Claims, 5 Drawing Sheets

(56) References Cited

U.S. PATENT DOCUMENTS

| | | |
|---|---|---|
| 9,558,005 B2 | 1/2017 | Sathyanarayana |
| 9,769,250 B2 | 9/2017 | Powers et al. |
| 9,842,039 B2 | 12/2017 | Siciliano et al. |
| 9,874,924 B1 * | 1/2018 | Li .................. G06F 9/5088 |
| 9,893,959 B1 * | 2/2018 | Duet ................ H04L 67/10 |
| 10,177,982 B2 | 1/2019 | Yu et al. |
| 10,237,201 B2 | 3/2019 | Kelly |
| 10,534,559 B2 | 1/2020 | Jain et al. |
| 10,642,800 B2 | 5/2020 | Gummaraju et al. |
| 2009/0041353 A1 | 2/2009 | Hoff et al. |
| 2010/0131624 A1 * | 5/2010 | Ferris ................ G06Q 30/06 709/221 |
| 2010/0293453 A1 | 11/2010 | Schwarz |
| 2011/0273213 A1 | 11/2011 | Rama |
| 2012/0102084 A1 * | 4/2012 | Hiltunen ............. G06F 1/32 709/201 |
| 2012/0180044 A1 * | 7/2012 | Donnellan ........ H04L 61/5007 718/1 |
| 2013/0061220 A1 | 3/2013 | Gnanasambandam et al. |
| 2016/0004552 A1 * | 1/2016 | Innan ................ G06F 9/5088 718/1 |
| 2018/0046489 A1 * | 2/2018 | Onoue ............... G06F 9/5083 |
| 2018/0129523 A1 * | 5/2018 | Bryant .............. G06F 9/45558 |
| 2018/0129524 A1 * | 5/2018 | Bryant .............. G06F 11/3006 |
| 2018/0349168 A1 * | 12/2018 | Ahmed ............. G06F 9/45558 |
| 2019/0026030 A1 * | 1/2019 | Yang ................. G06F 3/0688 |
| 2019/0097901 A1 * | 3/2019 | Saxena ................ H04L 43/04 |
| 2020/0034167 A1 | 1/2020 | Parthasarathy et al. |
| 2020/0285503 A1 * | 9/2020 | Dou .................. G06N 20/20 |

\* cited by examiner

DYNAMICALLY PROVISIONING VIRTUAL MACHINES FROM REMOTE, MULTI-TIER POOL

BACKGROUND

Many software applications increasingly run from remote data centers in the cloud. For example, a hosting service may run an enterprise application from one or more virtual machines on one or more physical servers in a data center. Users can access the enterprise application from their local machines over a network, such as the Internet.

In a common arrangement, a cloud provider operates a pool of virtual machines. The pool can allocate the virtual machines to various clients. Some pools are multi-tiered, meaning that they provide virtual machines having different levels of performance. For example, virtual machine levels may differ in terms of allocated memory, computing capability, and/or non-volatile storage. When configuring virtual machines for a cloud-based software application, clients can request the level of virtual machine that best suits their needs.

SUMMARY

The optimal choice of virtual machines to use in a given installation may vary over time based on numerous factors. For example, as demand grows, larger, more capable virtual machines may be needed. Also, as network traffic patterns change, the optimal geographical location of virtual machines for a given installation may change. Further, a variety of time-variant characteristics (TVCs) may change, such as network congestion, latency, power consumption, and other factors, which can affect the overall performance and/or user experience of the cloud-based software application. What is needed is a way to dynamically configure a cloud-based software installation using virtual machines in a pool based on changes in TVCs of the virtual machines, so as to promote a more optimal complement of virtual machines for use with a given software installation.

In contrast with prior approaches, an improved technique for dynamically provisioning virtual machines for running a cloud-based software application includes querying a pool manager of a multi-tiered pool of virtual machines to identify a set of classes of virtual machines, which meet a specified size criterion, and a respective TVC (time-variant characteristic) for each class. If an identified one of the set of classes has a smaller TVC than a TVC of one of the virtual machines currently running the application, the technique proceeds to swap the current virtual machine for a virtual machine having the identified class. In this manner, the improved technique adapts to changes in TVCs and promotes a more optimal arrangement.

Certain embodiments are directed to a method of dynamically provisioning virtual machines for running a cloud-based software application. The method includes operating a set of virtual machines in a multi-tiered pool of virtual machines, the set of virtual machines including a first virtual machine and a second virtual machine and implementing an installation of the cloud-based software application. The first virtual machine and the second virtual machine run on a set of physical computing servers and each have a respective value of a TVC (time-variant characteristic). The method further includes querying, by a selection server, a pool manager of the multi-tiered pool. The querying specifies a desired size of virtual machine. The method still further includes receiving, by the selection server from the pool manager in response to the querying, an identifier of a virtual machine class and a value of a TVC common to virtual machines in the identified virtual machine class. The identified virtual machine class includes virtual machines of the desired size and is one of multiple virtual machine classes available from the multi-tiered pool. The method still further includes selectively swapping a third virtual machine from the identified virtual machine class in place of the first virtual machine, based at least in part on the selection server determining that the TVC of the identified virtual machine class is less than the TVC of the first virtual machine.

Other embodiments are directed to a computerized apparatus constructed and arranged to perform a method of dynamically provisioning virtual machines for running a cloud-based software application, such as the method described above. Still other embodiments are directed to a computer program product. The computer program product stores instructions which, when executed on control circuitry of a computerized apparatus, cause the computerized apparatus to perform a method of dynamically provisioning virtual machines for running a cloud-based software application, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for dynamically provisioning virtual machines for running a cloud-based software application includes querying a pool manager of a multi-tiered pool of virtual machines to identify a set of classes of virtual machines, which meet a specified size criterion, and a respective TVC (time-variant characteristic) for each class. If an identified one of the set of classes has a smaller TVC than a TVC of one of the virtual machines currently running the application, the technique proceeds to swap the current virtual machine for a virtual machine having the identified class.

Figure 1:
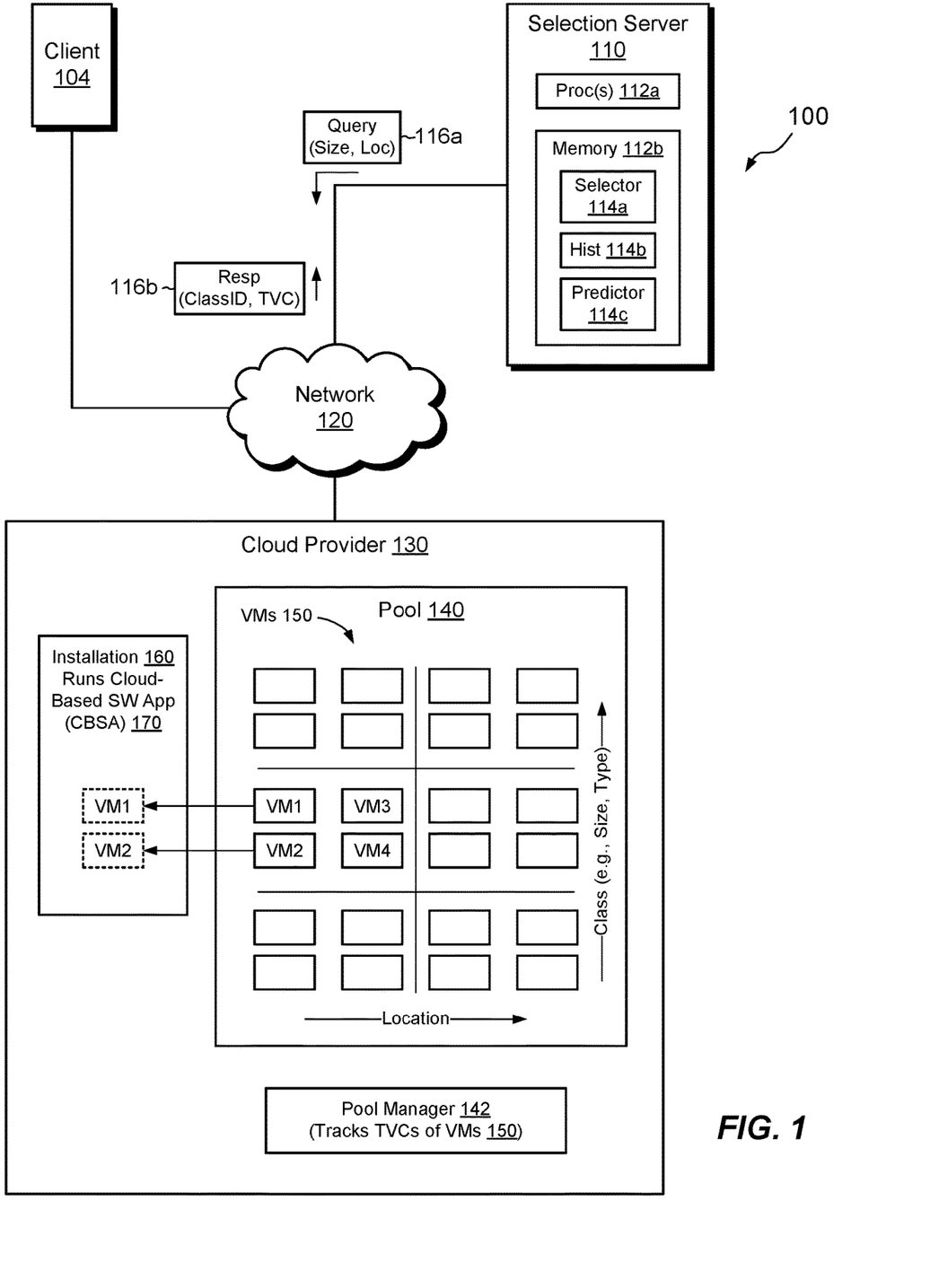
FIG. 1 is a block diagram of an example environment in which embodiments of the improved technique hereof can be practiced.

FIG. 1 shows an example environment 100 in which embodiments of the improved technique hereof can be practiced. Here, a client computer 104 is coupled over a network 120 to a cloud provider 130, which operates a pool 140 of virtual machines ("VMs") 150. The network 120 may be any type of network or combination of networks, such as a local area network (LAN), a wide area network (WAN), the Internet, and/or some other type of network or combination of networks, for example. The pool 140 is a multi-tiered pool that provides different classes of VMs 150, wherein each "class" designates a particular size and type of VM. Different sizes of VMs 150 may be allocated different amounts of memory, computational resources (e.g., CPUs, GPUs, etc.), and/or non-volatile storage (e.g., from disk drives, electronic flash drives, etc.). Different types of VMs may provide different operating systems, versions, and/or allocation options, e.g., whether the VMs are allocated as a reserved, on-demand, or spot instances. Although VMs are software structures, one should appreciate that each VM in the pool 140 is supported by a respective amount of memory, processing power, and non-volatile storage, which may be accessed through a physical computing server. For example, the cloud provider 130 may operate a large number of physical computing servers (not shown), with each physical computing server running one or more VMs 150.

The pool 140 may also organize VMs based on location. For example, the pool 140 may be a geographically distributed structure, having physical computing servers that run VMs at various locations, such as in different counties, states, and/or countries.

As further shown in FIG. 1, the cloud provider 130 includes a pool manager 142, which is configured to manage allocation of VMs 150 to different clients (like client 104) and to track various TVCs (time-variant characteristics). In various examples, the pool manager 142 tracks TVCs at VM-level granularity and/or at class-level granularity. For instance, the pool manager 142 may provide a respective value of TVC for each class of VM 150 supported by the multi-tiered pool 140. In some examples, the pool manager 142 further tracks TVCs at location-level granularity. TVCs may include any characteristic of VMs, VM classes, and/or VM locations that vary over time. Non-limiting examples of TVCs may include network congestion, latency, scarcity, power consumption, and/or demand, for example. In some examples, the pool manager has an API (application program interface) that enables communication with outside entities, such as a selection server 110, described further below.

In the example shown, the client 104 has configured an installation 160 of a cloud-based software application (CBSA) 170. For example, the CBSA 170 may have been developed by an organization that operates the client 104 and may be accessed by users of that organization (not shown). To promote fault tolerance and load balancing, the installation 160 may include a set of VMs, such as two VMs, VM1 and VM2. In some examples, the set of VMs may include greater than two VMs. Although VM1 and VM2 are shown outside the pool 140, this is merely for illustration, as these VMs operate within the pool 140. Users of the CBSA 170 may access the CBSA 170 over the network 120, e.g., in a client-server type of arrangement. No particular software architecture is required, however.

As further shown in FIG. 1, the environment 100 includes a selection server 110, which may be operated, for example, by the same organization that operates the client computer 104. As shown, the selection server 110 includes a set of processors 112a (e.g., one or more processing chips and/or assemblies) and memory 112b, such as volatile memory, e.g., Random Access Memory (RAM), and non-volatile memory, such as one or more ROMs (Read-Only Memories), disk drives, solid state drives, and the like. The set of processors 112a and the memory 112b together form control circuitry, which is constructed and arranged to carry out aspects of various methods and functions as described herein. Also, the memory 112b includes a variety of software constructs realized in the form of executable instructions. When the executable instructions are run by the set of processors 112a, the set of processors 112a carry out the operations of the software constructs. Although certain software constructs are specifically shown and described, it is understood that the memory 112b typically includes many other software constructs, which are not shown, such as an operating system, various applications, processes, and daemons. One should appreciate, however, that no particular hardware arrangement is required of the selection server 110. For instance, the selection server 110 may itself be operated on a VM 150 within the pool 140.

As further shown, the memory 112b of the selection server 110 "includes," i.e., realizes by execution of software instructions, a selector 114a, historical data 114b, and a predictor 114c. The selector 114a is configured to select an optimal VM 150 from the pool 140, for use in the CBSA 170, based on various factors. In some examples, the historical data 114b tracks trends in the usage of the VMs of the CBSA 170 over time, and/or tracks values of one or more TVCs of one or more classes of VMs 150 in the pool 140 over time. The predictor 114c is configured to predict, based on historical data 114b, times when usage of VMs supporting the CBSA 170 are likely to decrease, which may inform decisions as to whether and when to downsize one or both of the VMs. In some examples, the predictor 114c is further configured to predict, based on historical data 114b, increases and/or spikes in one or more TVCs, which may inform decisions to swap VMs proactively, e.g., in preparation for changes in TVCs.

In example operation, the CBSA 170 runs in installation 160 using virtual machines VM1 and VM2. Client 104 (and/or other clients) connects to the cloud provider 130 over the network 120 and accesses the CBSA 170. In a non-limiting example, the CBSA 170 is an enterprise application developed by an organization for use by that organization in managing mobile devices of employees.

At some point while the CBSA 170 operates, selection server 110 sends a query 116a to the pool manager 142 of the cloud provider 130. The query 116a may specify, as query criteria, a desired size of a virtual machine for use in the installation 160 and, in some examples, a desired location of a virtual machine. The desired "size" may match the current size of the virtual machines VM1 and VM2. Alternatively, it may be a different size, such as a larger size if greater hardware capability is needed, or a smaller size if lesser hardware capability is needed. In some examples, the query 116a may specify multiple sizes, e.g., if more than one size of VM would be adequate. The desired "location" may be a geographical location close to the client computer 104 (or multiple such computers). For example, if the client computer 104 is located in western Massachusetts, the specified location may be a data center in or near western Massachusetts.

The pool manager 142 receives the query 116a, obtains information about all matching VM classes, and returns a response 116b back to the selection server 110. The response 116b includes one or more class identifiers (IDs), which identify particular classes of VMs 150, and corresponding TVCs of those classes, e.g., one TVC for each class ID returned. In an example, the TVC returned for each class ID is common to all members (VMs) in the respective class. Also, for example, each class identified by a returned class ID in the response 116b matches the values of size and location specified in the query 116a.

The selection server 110, upon receiving the response 116b, compares the returned TVCs with TVCs that reflect the current state of VM1 and/or VM2. For example, if multiple TVCs are returned for multiple respective classes, the selector 114a identifies the class ID that corresponds to the smallest value across TVC of all TVCs returned. Thus, if two values of TVC are returned, "3" and "5," the selector 114a would select the class ID whose TVC is "3." We may call this class ID "Class A." Next, the selector 114a compares the TVC of Class A with the current TVC (or TVCs) associated with VM1 and/or VM2. If the TVC of Class A is less than that of VM1, the selector may direct the pool manager 142 to swap out VM1 and replace it with a VM from Class A, such as VM3. The installation 160 of the CBSA 170 may then operate with VM2 and VM3, instead of with VM1 and VM2. In a similar manner, if the TVC of Class A is less than that of VM2, the selector 114a may direct the pool manager 142 to swap out VM2 and replace it with a VM from Class A, such as VM4. The installation 160 of the CBSA 170 may then operate with VM3 and VM4.

Preferably, the selection server 110 directs the pool manager 142 to swap virtual machines in installation 160 in a non-disruptive manner. For example, while VM1 is being taken down, VM2 continues to operate and serve clients. Only after VM1 has been replaced with VM3 and VM3 has been booted, loaded with necessary software, and started is VM2 then taken down and replaced, during which time VM3 continues to operate and serve clients. Thus, at no time is there a disruption in service to clients.

One should appreciate that the response 116b to the query 116a may specify only a single class ID and its associated TVC. In this scenario, the single returned TVC may be treated as was the minimum TVC above. Also, if VM1 and VM2 initially have different TVCs, then the selection server 110 may direct the swapping of one virtual machine but not the other. Further, if none of the TVCs returned in the response 116b is smaller than the TVC of VM1 or the TVC of VM2, then no action may be taken, as the CBSA 170 may already be optimally configured.

Figure 2:
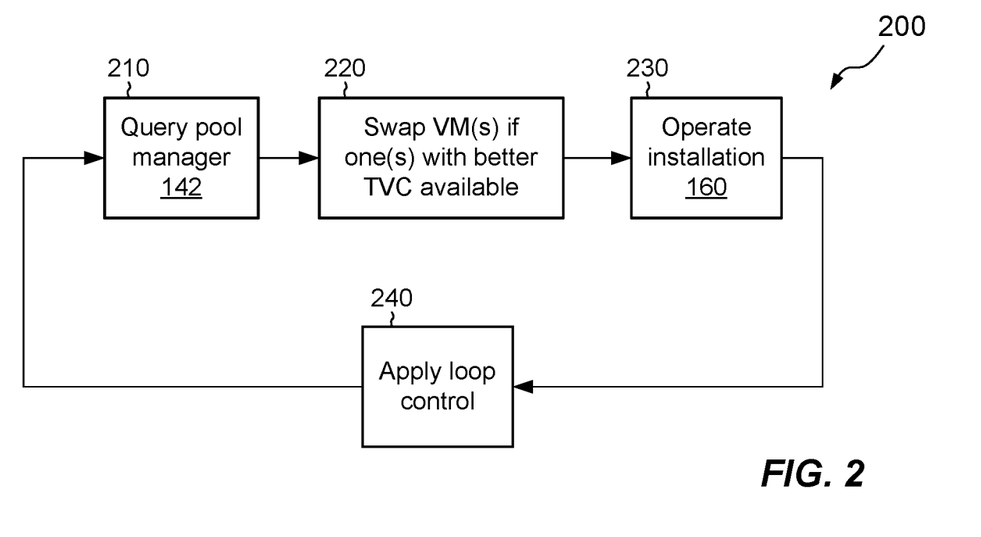
FIG. 2 is a flowchart of an example control loop for swapping virtual machines from a pool in place of virtual machines already running an installation of a cloud-based software application.

FIG. 2 shows an example control loop 200 for repetitively performing the above-described querying, swapping, and operating activities. Here, an act 210 of querying the pool manager 142, such as by a query 116a (FIG. 1), is followed by an act 220 of selectively swapping VMs in the installation 160. Swapping of a VM is performed if a VM 150 in the pool 140 meets the query criteria and has a more favorable (e.g., lower) value of TVC than does a VM currently used in the installation 160. Act 230 operates the installation 160 with the original or swapped VMs, depending on what was done during act 220. Although act 230 is shown at a distinct point in the control loop 200, one should appreciate that the installation 160 preferably continues to operate at all times, although the particular VMs used in the installation 160 may change over time. During act 240, loop control is applied, prior to returning to act 210 and again querying the pool manager 142. In an example, the loop control waits a predetermined amount of time, such as 1 minute, 5 minutes, etc., before returning to act 210. In an example, the amount of time to wait during act 240 is based on how quickly TVCs of VMs 150 are expected to change. In the manner described, the control loop 200 operates repetitively and for an indefinite period of time, e.g., as long as the installation 160 is running.

In some examples, the loop control waits different amounts of times before returning to act 210, depending on whether a VM was swapped during the immediately-previous operation of act 220. For example, if one or both VMs are swapped during an operation of act 220, the control loop may wait longer (e.g., 10 minutes, 20 minutes, 50 minutes, etc.), before returning to act 210. Waiting longer after swapping a VM prevents the system from swapping VMs too quickly and risking reductions in performance of the CBSA 170, which may require two working VMs for maximum performance.

In some examples, the act 220 of selectively swapping VMs applies a threshold to TVC values. For instance, act 220 may swap VMs only if the TVC of a query-matching VM class in the pool 140 falls below the TVC of one of the VMs in the installation 160 by greater than a predetermined threshold. Applying a threshold in this fashion further acts to prevent excessive swapping of VMs, which can impair performance.

Figure 3:
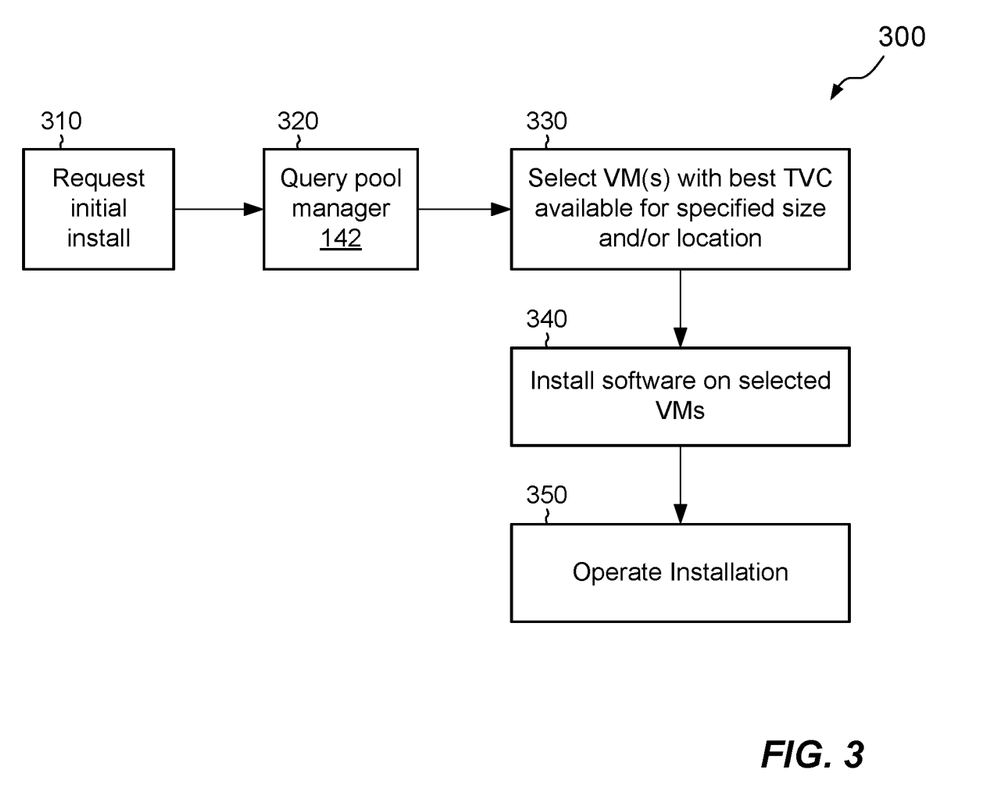
FIG. 3 is a flowchart of an example method for initially configuring the cloud-based software application based at least in part on a TVC (time-varying characteristic).

FIG. 3 shows an example procedure 300 for performing an initial configuration of the CBSA 170. In an example, the procedure 300 is performed prior to the operation of the installation 160 as shown in FIG. 2.

During act 310, the selection server 110 (FIG. 1) receives a request to perform an initial installation of the CBSA 170. The request may specify a desired size of VMs and/or a desired geographical location of VMs.

At 320, in response to the request, the selection server 110 sends a query, like query 116a, to the pool manager 142. The query specifies the desired size and/or location as query criteria. In response to the query, the selection server 110 receives, from the pool manager 142, one or more class IDs of VMs 150 that meet the query criteria, as well as corresponding TVCs, one for each class ID.

At 330, the selection server 110 compares the TVCs returned from the pool manager 142. The selection server 110 identifies the minimum TVC from among those returned and selects the class ID associated with that minimum TVC. The selection server 110 then sends a request to the pool manager 142 to allocate two VMs (e.g., VM1 and VM2) from the selected class ID to the installation 160.

At 340, the selection server 110 directs the pool manager 142 to install the CBSA 170 onto each of the allocated VMs. At 350, the software is started and begins operating. At this point, the installation 160 may proceed to operate in the manner shown in FIG. 2, i.e., in an indefinite loop, in which VMs in the installation 160 are selectively replaced, over time, with VMs 150 that have lower TVCs.

Figure 4:
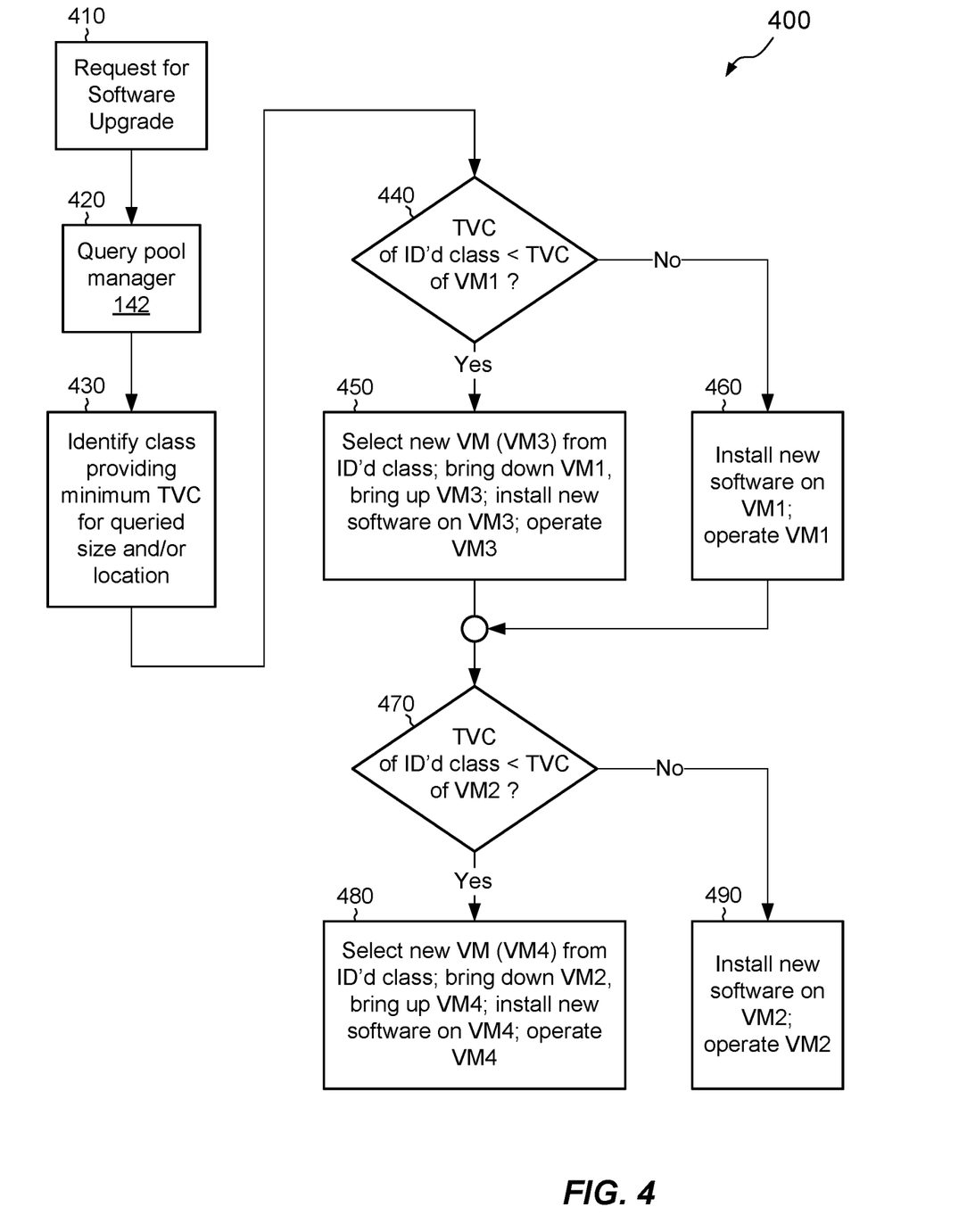
FIG. 4 is a flowchart of an example method for selectively swapping virtual machines when performing a software upgrade on the cloud-based software application.

FIG. 4 shows an example procedure 400 for performing a software upgrade of the CBSA 170 in the installation 160. The procedure 400 is similar to the procedure 300 for initially installing software, except that additional care is taken during the upgrade procedure 400 to ensure that there is always at least one virtual machine running in the installation 160, to prevent disruption to clients.

At 410, a request is received for performing a software upgrade on the installation 160. The request may be received by the selection server 110, by a separate configuration server (not shown), or by some other component operated by the same organization that operates the selection server. As the software upgrade may require taking VMs in the installation 160 out of service temporarily, the upgrade provides a good opportunity to swap VMs with very little additional effect on performance.

At 420, the selection server 110 sends a query 116a to the pool manager 142. The query specifies, for example, a desired size and/or location of VMs for the installation 160. Typically, these may match the size and location of the VMs currently running. However, different sizes may be needed for optimally running the new version of the software, which may, for example, require larger processors, more memory, and so forth.

At 430, the selection server 110 receives a response 116b, which may include one or more VM class IDs and corresponding values of TVCs, one for each class ID. The selection server 110 identifies the class ID associated with the minimum TVC from among those returned.

At 440, the selection server 110 tests whether the minimum TVC is less than the TVC of a first VM (VM1) currently running in the installation. If not, operation proceeds to 460, whereupon the selection server 110 directs the pool manager 142 to install the new software on VM1 and to start the new software on VM1. However, if the minimum TVC is less than the TVC of VM1, operation proceeds to 450, whereupon the selection server 110 directs the pool manager 142 to allocate a new VM (e.g., VM3) from the identified class ID. The selection server 110 further directs the pool manager 142 to tear down VM1, bring up VM3, install the new software on VM3, and then operate the new software on VM3. At this point, VM2 and VM3 are both running. VM1 has been deallocated and is no longer part of the installation 160. Notably, VM2 is unaffected by the activities of act 450. Rather, VM2 remains running as usual, providing service to clients in the normal manner.

Next, at 470, the selection server 110 checks whether the minimum TVC associated with the identified class ID is also less than the TVC of VM2. If not, operation proceeds to act 490, whereupon the selection server 110 directs the pool manager 142 to install the new software on VM2 and to start the new software on VM2. However, if the minimum TVC is less than the TVC of VM2, operation proceeds to 480, whereupon the selection server 110 directs the pool manager 142 to allocate a new VM (VM4) from the identified class ID. The selection server 110 further directs the pool manager 142 to tear down VM2, bring up VM4, install the new software on VM4, and then operate the new software on VM4. At this point, VM3 and VM4 are both running. VM1 and VM2 have both been deallocated and are no longer part of the installation 160. Notably, VM3 is unaffected by the activities of act 480. Rather, VM3 remains running as usual, providing service to clients in the usual manner. Note that act 470 may be performed at some earlier point, such as during the test 440 (e.g., both tests may be performed at the same time).

It can thus be seen that the software upgrade, which may include swapping VMs, is performed with little or no disruption to clients. VM2 continues to run while VM1 is being upgraded, and VM3 continues to run while VM2 is being upgraded. There is at least one VM running at all times during the upgrade.

Figure 5:
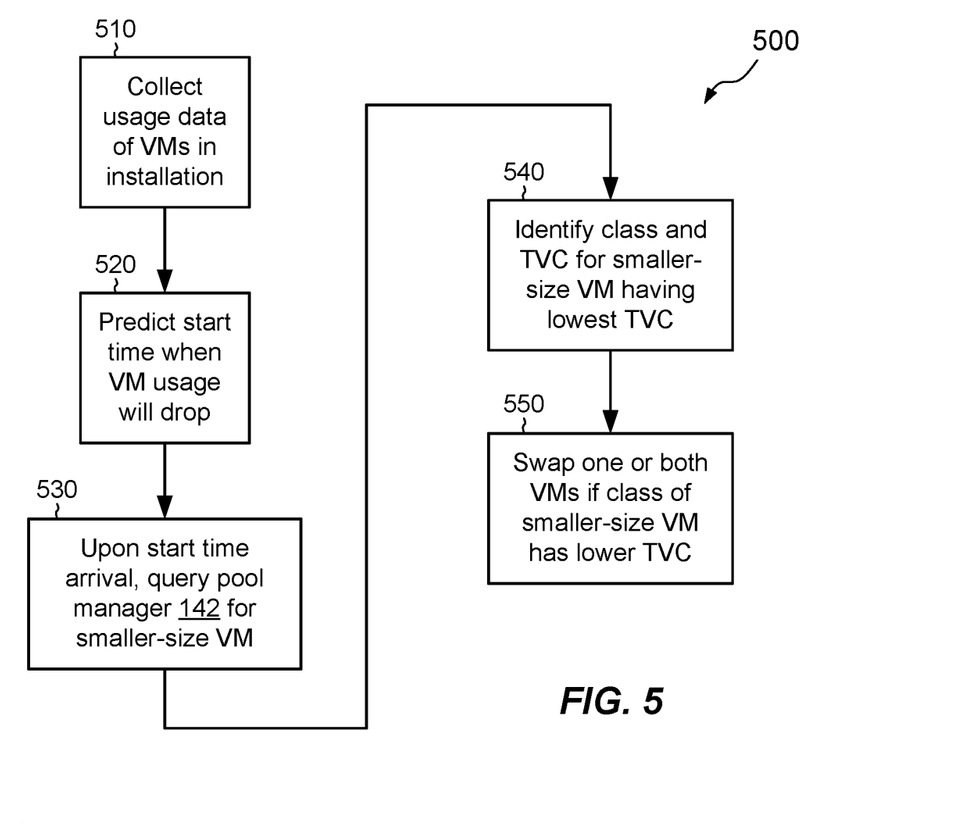
FIG. 5 is a flowchart showing an example method of selectively downsizing virtual machines using predictions based on collected usage data.

FIG. 5 shows an example procedure 500 for selectively downsizing virtual machines in the installation 160 during off-peak periods. For example, the selection server 110 may swap out larger VMs in the installation 160 and replace them with smaller VMs that perform their functions nearly as well during off-peak periods but consume fewer resources.

At 510, the selection server 110 collects usage data of VMs in the installation 160, such as VM1 and VM2. For example, the selection server 110 communicates with the pool manager 142 on a regular basis to obtain usage data of VM1 and VM2. The usage data may include, for example, CPU utilization, memory utilization, network traffic, and the like. The selection server 110 stores the usage data in the history 114b (FIG. 1). In an example, the selection server 110 stores the usage data in a time-indexed manner, which enables the selection server 110 to generate a time series of usage for each VM. By analyzing the time series data, the selection server 110 detects periods of relative inactivity. For example, the selection server 110 may detect that the activity of VM1 and VM2 drops sharply after 1 AM EDT and remains low until 7 AM EDT.

At 520, the predictor 114c in the selection server 110 predicts a start time when VM usage will likely drop. For instance, 1 AM EDT may provide the start time in the above example.

At 530, upon arrival of the predicted start time (e.g., at 1 AM EDT), the selection server 110 sends a query 116a to the pool manager 142. The query 116a may specify as a query criterion, for example, a VM size that is smaller than the current size of VM1 and/or VM2, so as to effect the desired downsizing. As in the previous examples, the query 116a may also specify a location criterion.

At 540, the selection server 110 receives a response 116b, which includes one or more class IDs of VMs that meet the query criteria, and associated TVCs. The selection server 110 then identifies the class ID associated with the minimum returned TVC, and selects one or more VMs from the identified class.

At 550, the selection server 110 directs the pool manager 142 to swap one or both current VMs (VM1 and/or VM2) for one or more VMs in the identified class. Preferably, swapping proceeds one VM at a time, such that one VM remains running at all times, e.g., in the manner described in connection with FIG. 4.

Although not shown, the selection server 110 may perform similar activities upon the arrival of a predicted stop time, e.g., at 7 AM EDT in the example above, but by changing the size of VMs in the opposite direction. For example, upon the arrival of the predicted stop time, the selection server 110 may query the pool manager 142 for larger VMs, e.g., VMs that are the same size as the original VM1 and VM2, and may proceed to swap the larger VMs for the current VMs, selecting larger VMs from classes that provide the minimum TVC.

Figure 6:
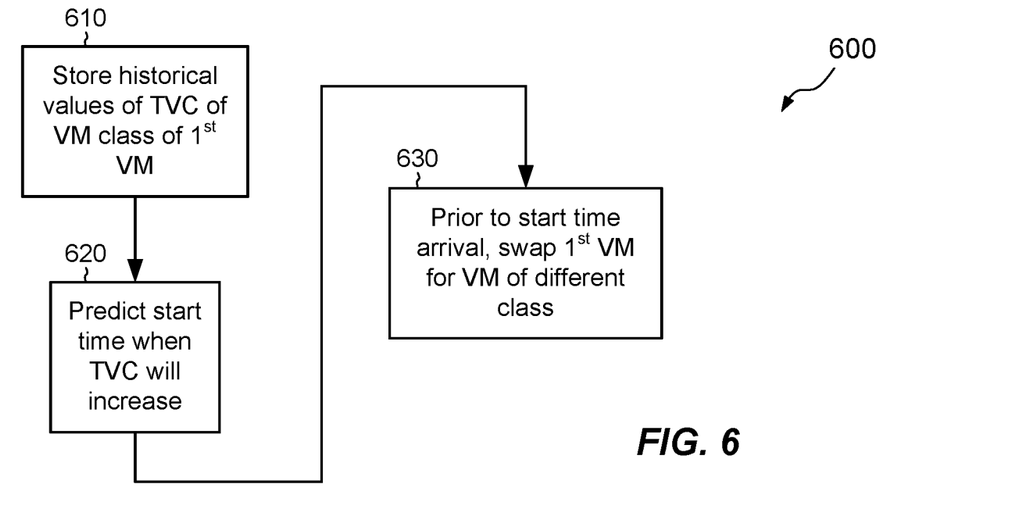
FIG. 6 is a flowchart showing an example method of swapping virtual machines based on machine-learning predictions.

FIG. 6 shows an example procedure 600 for proactively swapping VMs in the installation 160 (e.g., VM1 and/or VM2) in response to predicted changes in TVCs over time. For example, the selection server 110 may replace VM1 and/or VM2 for other particular VMs from the pool 140, even when the other VMs currently have TVCs that are greater than those of VM1 and/or VM2. In this example, swapping is performed based on predictions that the TVCs of VM1 and/or VM2 will soon exceed those of the other particular VMs in the pool 140. Proactively swapping VMs can thus help to optimize the installation 160, by anticipating changes in TVCs and responding to the anticipated changes before they occur. An example of this procedure 600 may proceed as follows.

At 610, the selection server 110 gathers and stores history data 114b describing a TVC of the VM class to which VM1 and/or VM2 belongs, as the TVC varies over time. The selection server 110 then constructs a time series of the TVC.

At 620, the predictor 114c generates a prediction, based on the time series, of a start time at which the TVC is likely to increase. In some examples, the prediction of the start time may be based on the TVC of the class of VM1 and/or VM2 alone. In other examples, the prediction of the start time is based on both the TVC of this class and on the TVCs of other classes of VMs in the pool 140 having the same size and/or location as VM1 and/or VM2. Thus, the prediction of start time may be based on changes in one TVC for one class or in changes in a difference between two TVCs for two classes.

At 630, shortly prior to the arrival of the predicted start time, the selection server 110 directs the pool manager 140 to swap VM1 and/or VM2 for a VM of a different class. For example, the selection server 110 may issue a swap request 1 minute, 5 minutes, 1 hour, or some other predetermined interval of time prior to the arrival of the predicted start time.

In some examples, swapping VMs is preceded by a corresponding query 116a and response 116b, e.g., in the same manner as described in connection with other examples above. In other examples, swapping is performed without first sending a query 116a. Rather, a particular class of virtual machines may be pre-assigned for this purpose. Alternatively, the class of VM swapped in place of VM1 and/or VM2 is one whose TVC is predicted to be less than that of VM1 and/or VM2 upon the arrival of the start time. For example, the history data 114b may track not only the TVC of VM1 and VM2 over time, but also the TVCs of other classes in the pool 140.

In some examples, the predictor 114c that performs the above-described time-series analysis may be constructed as a machine-learning predictor. The predictor 114c may use history data 114b as training data and may improve predictions over time as more training data is acquired.

In some examples, the selection server 110 may be configured to detect sudden increases in the TVC of the particular class to which VM1 and/or VM2 belongs. For example, the selection server 110 may monitor a TVC of the particular class, acquiring a new TVC sample on a regular basis, such as once per minute. In the event that an increase in TVC exceeds a predetermined rate, the selection server 110 may immediately begin swapping VM1 and/or VM2 with a VM from a different class, e.g., one that is not experiencing a sudden increase in TVC.

Figure 7:
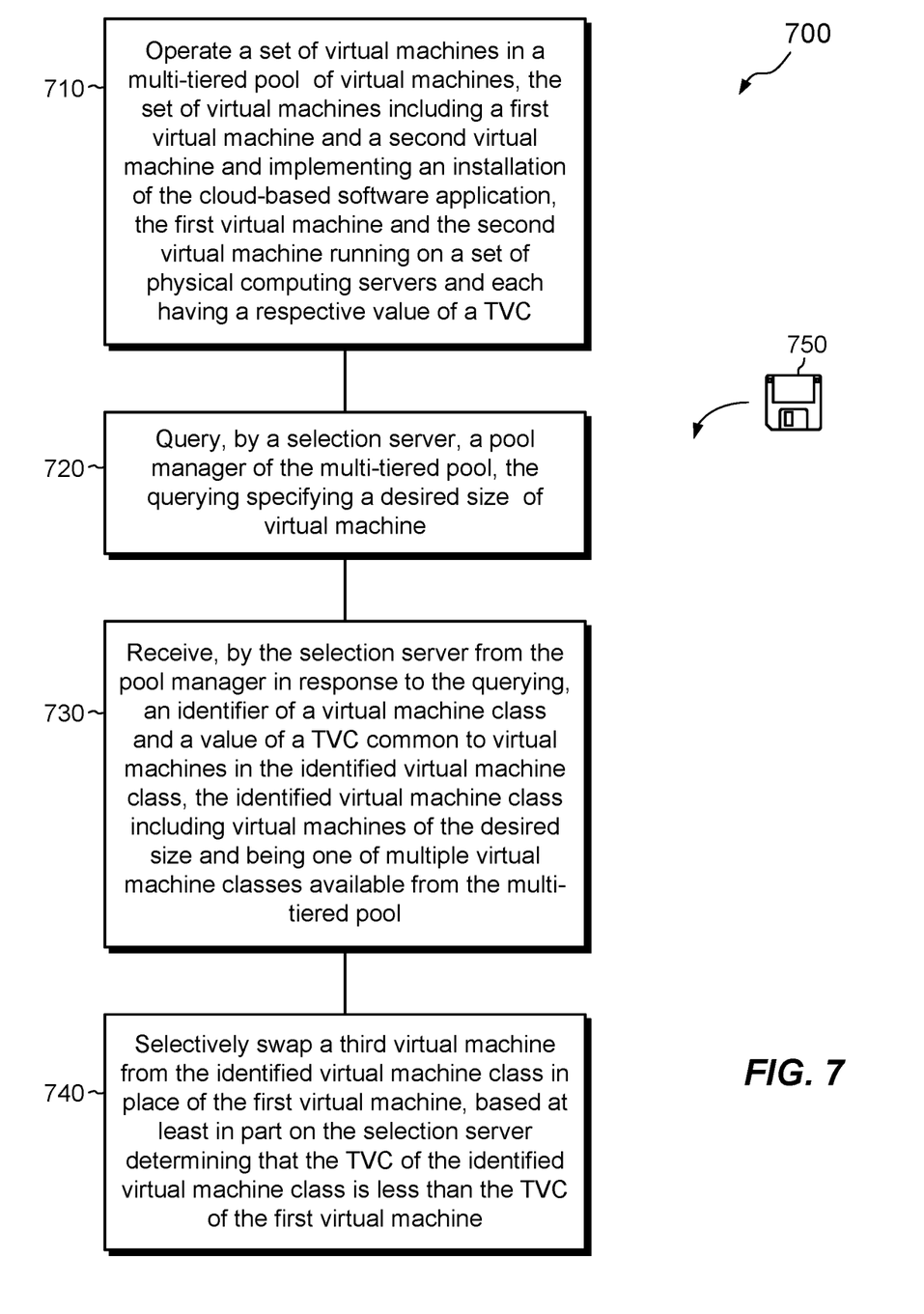
FIG. 7 is a flowchart showing an example method of dynamically provisioning virtual machines for running a cloud-based software application.

FIG. 7 shows an example method 700 that may be carried out in connection with the environment 100. The method 700 is typically performed, at least in part, by the software constructs described in connection with FIG. 1, which reside in the memory 112b of the selection server 110 and are run by the set of processors 112a. The various acts of method 700 may be ordered in any suitable way.

At 710, a set of virtual machines is operated in a multi-tiered pool 140 of virtual machines 150. The set of virtual machines includes a first virtual machine VM1 and a second virtual machine VM2 that together implement an installation 160 of the cloud-based software application 170. The first virtual machine VM1 and the second virtual machine VM2 run on a set of physical computing servers and each have a respective value of a TVC (time-variant characteristic).

At 720, the selection server 110 queries a pool manager 142 of the multi-tiered pool 140, with a query 116a specifying a desired size of virtual machine.

At 730, the selection server 110 receives from the pool manager 142 in a response 116b to the query 116a, an identifier of a virtual machine class and a value of a TVC common to virtual machines in the identified virtual machine class. The identified virtual machine class includes virtual machines of the desired size and is one of multiple virtual machine classes available from the multi-tiered pool 140.

At 740, a third virtual machine VM3 from the identified virtual machine class is selectively swapped in place of the first virtual machine VM1, based at least in part on the selection server 110 determining that the TVC of the identified virtual machine class is less than the TVC of the first virtual machine, VM1.

An improved technique has been described for dynamically provisioning virtual machines for running a cloud-based software application 170. The technique includes querying a pool manager 142 of a multi-tiered pool 140 of virtual machines 150 to identify a set of classes of virtual machines, which meet a specified size criterion, and a respective TVC (time-variant characteristic) for each class. If an identified one of the set of classes has a smaller TVC than a TVC of one of the virtual machines currently running the cloud-based software application 170, the technique proceeds to swap the current virtual machine for a virtual machine in the pool having the identified class. In this manner, the improved technique adapts to changes in the TVC and promotes a more optimal arrangement.

Having described certain embodiments, numerous alternative embodiments or variations can be made. For example, although certain activities have been attributed herein to a single selection server 110, one should appreciate that such activities may be performed using multiple computers or virtual machines.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of dynamically provisioning virtual machines for running a cloud-based software application, the method comprising:
operating a set of virtual machines in a multi-tiered pool of virtual machines, the set of virtual machines implementing the cloud-based software application and including an initial virtual machine having a TVC (time-variant characteristic) and a size, wherein the TVC is network congestion;
predicting, based on usage data of the initial virtual machine, a start time at which the initial virtual machine will experience a lower usage than it does at other times; and
upon arrival of the start time, selectively swapping the initial virtual machine for a selected virtual machine having a smaller size than the initial virtual machine and a different TVC than the initial virtual machine, wherein the method further comprises, prior to selectively swapping:
querying a pool manager of the multi-tiered pool, the querying specifying a virtual machine size smaller than the size of the initial virtual machine; and
receiving a query response from the pool manager, the query response identifying multiple classes of virtual machines, the identified classes including virtual machines smaller than the initial virtual machine and having respective values of the TVC,
wherein the selected virtual machine is a first virtual machine, wherein the cloud-based software application is deployed on the first virtual machine and a second virtual machine, and wherein the method further comprises selectively swapping the second virtual machine for a second selected virtual machine having a smaller size than the second virtual machine and a different TVC than the second virtual machine, and
wherein selectively swapping the second virtual machine for the second selected virtual machine is performed after swapping the initial virtual machine and after ensuring that the selected virtual machine that replaces the initial virtual machine is running.

2. The method of claim 1, further comprising:
identifying a class of virtual machines having a lowest TVC among the multiple classes identified in the query response; and
identifying the selected virtual machine from the identified class.

3. The method of claim 1, further comprising collecting the usage data of the initial virtual machine on a regular basis.

4. The method of claim 3, wherein collecting the usage data includes collecting any of CPU utilization, memory utilization, and/or network traffic.

5. The method of claim 3, further comprising:
storing the usage data in a time-indexed manner; and
generating a time series of the usage data for the initial virtual machine,
wherein predicting the start time includes analyzing the time series of usage data.

6. The method of claim 1, wherein selectively swapping the initial virtual machine for the selected virtual machine is based upon the query response from the pool manager identifying a virtual machine that both (i) has a smaller size than the initial virtual machine and (ii) has a TVC smaller than the TVC of the initial virtual machine.

7. The method of claim 6, wherein the query response identifies multiple virtual machines having smaller size than the initial virtual machine, and wherein selectively swapping the initial virtual machine for the selected virtual machine includes selecting a virtual machine having a smallest TVC from among the multiple virtual machines.

8. A computerized apparatus, comprising control circuitry that includes a set of processors coupled to memory, the control circuitry constructed and arranged to:
operate a set of virtual machines in a multi-tiered pool of virtual machines, the set of virtual machines implementing the cloud-based software application and including an initial virtual machine having a TVC (time-variant characteristic) and a size, wherein the TVC is power consumption;
predict, based on usage data of the initial virtual machine, a start time at which the initial virtual machine will experience a lower usage than it does at other times; and
upon arrival of the start time, selectively swap the initial virtual machine for a selected virtual machine having a smaller size than the initial virtual machine and a different TVC than the initial virtual machine, wherein the control circuitry constructed and arranged to selectively swap is further constructed and arranged, prior to the swap, to:
query a pool manager of the multi-tiered pool, the query specifying a virtual machine size smaller than the size of the initial virtual machine; and
receive a query response from the pool manager, the query response identifying multiple classes of virtual machines, the identified classes including virtual machines smaller than the initial virtual machine and having respective values of the TVC,
wherein the initial virtual machine is a first virtual machine, wherein the cloud-based software application is deployed on the first virtual machine and a second virtual machine, and wherein the control circuitry is further constructed and arranged to selectively swap the second virtual machine for a second selected virtual machine having a smaller size than the second virtual machine and a different TVC than the second virtual machine, and
wherein the control circuitry constructed and arranged to selectively swap the second virtual machine for the second selected virtual machine is further constructed and arranged to swap the initial virtual machine after swapping the initial virtual machine and ensuring that the selected virtual machine that replaces the initial virtual machine is running.

9. The computerized apparatus of claim 8, wherein the control circuitry is further constructed and arranged to:
identify a class of virtual machines having a lowest TVC among the multiple classes identified in the query response; and
identify the selected virtual machine from the identified class.

10. The computerized apparatus of claim 8, wherein the control circuitry is further constructed and arranged to collect the usage data of the initial virtual machine on a regular basis, wherein the usage data includes any of CPU utilization, memory utilization, and/or network traffic.

11. A computer program product including a set of non-transitory, computer-readable media having instructions which, when executed by control circuitry of a computerized apparatus, cause the control circuitry to perform a method for dynamically provisioning virtual machines for running a cloud-based software application, the method comprising:
Operating a set of virtual machines in a multi-tiered pool of virtual machines, the set of virtual machines implementing the cloud-based software application and including an initial virtual machine having a TVC (time-variant characteristic) and a size, wherein the TVC is power consumption;
predicting, based on usage data of the initial virtual machine, a start time at which the initial virtual machine will experience a lower usage than it does at other times; and
upon arrival of the start time, selectively swapping the initial virtual machine for a selected virtual machine having a smaller size than the initial virtual machine and a different TVC than the initial virtual machine, wherein the method further comprises, prior to selectively swapping:
querying a pool manager of the multi-tiered pool, the querying specifying a virtual machine size smaller than the size of the initial virtual machine; and
receiving a query response from the pool manager, the query response identifying multiple classes of virtual machines, the identified classes including virtual machines smaller than the initial virtual machine and having respective values of the TVC,
wherein the initial virtual machine is a first virtual machine, wherein the cloud-based software application is deployed on the first virtual machine and a second virtual machine, and wherein the method further comprises selectively swapping the second virtual machine for a second selected virtual machine having a smaller size than the second virtual machine and a different TVC than the second virtual machine, and
wherein selectively swapping the second virtual machine for the second selected virtual machine is performed after swapping the initial virtual machine and after ensuring that the selected virtual machine that replaces the initial virtual machine is running.

12. The computer program product of claim 11, wherein the method further comprises:
identifying a class of virtual machines having a lowest TVC among the multiple classes identified in the query response; and
identifying the selected virtual machine from the identified class.

13. The computer program product of claim 11, wherein the method further comprises collecting the usage data of the initial virtual machine on a regular basis.

14. The computer program product of claim 13, wherein collecting the usage data includes collecting any of CPU utilization, memory utilization, and/or network traffic.

15. The computer program product of claim 13, wherein the method further comprises:
storing the usage data in a time-indexed manner; and
generating a time series of the usage data for the initial virtual machine,
wherein predicting the start time includes analyzing the time series of usage data.

* * * * *